US005470645A

United States Patent [19]
Oguchi et al.

[11] Patent Number: 5,470,645
[45] Date of Patent: Nov. 28, 1995

[54] MAGNETIC RECORDING MEDIUM HAVING TWO MAGNETIC LAYERS COMPRISING MAGNETIC POWDER AND BINDER

[75] Inventors: Toshihiko Oguchi; Hajime Takeuchi; Minori Murano, all of Kanagawa, Japan

[73] Assignees: Kabushiki Kaisha Toshiba, Kanagawa; Konica Corporation, Tokyo, both of Japan

[21] Appl. No.: 156,972

[22] Filed: Nov. 24, 1993

Related U.S. Application Data

[63] Continuation of Ser. No. 885,745, May 19, 1992, abandoned.

[30] Foreign Application Priority Data

May 20, 1991 [JP] Japan .................................. 3-114440

[51] Int. Cl.$^6$ ..................................................... G11B 5/00
[52] U.S. Cl. ........................ 428/212; 428/323; 428/328; 428/329; 428/336; 428/425.9; 428/694 BM; 428/694 BN; 428/694 BH; 428/900
[58] Field of Search ................................. 428/212, 323, 428/328, 329, 336, 425.9, 694, 900, 694 BM, 694 BN, 694 BH; 427/128, 131

[56] References Cited

U.S. PATENT DOCUMENTS

| | | | |
|---|---|---|---|
| 4,511,617 | 4/1985 | Hideyama et al. | 428/212 |
| 4,624,894 | 11/1986 | Kishimoto | 428/328 |
| 4,643,941 | 2/1987 | Miyoshi et al. | 428/323 |
| 5,077,131 | 12/1991 | Nakano | 428/423.9 |
| 5,156,908 | 10/1992 | Araki et al. | 428/323 |

FOREIGN PATENT DOCUMENTS 1-220219  9/1989  Japan .

OTHER PUBLICATIONS

Patent Abstracts of Japan, vol. 14, No. 581 (P–1147) Dec. 26, 1990, & JP–A–2 249 129 (Konica Corporation), Oct. 4, 1990.

*Primary Examiner*—Stevan A. Resan
*Attorney, Agent, or Firm*—Finnegan, Henderson, Farabow, Garrett & Dunner

[57] ABSTRACT

A magnetic recording medium comprises a non-magnetic base material, a lower magnetic layer containing a magnetic powder for recording in a long wavelength range, and an upper magnetic layer containing a magnetic powder for recording in a short wavelength range. By adding a small particle abrasive with a median diameter in the range from 0.05 to 0.3 μm to the upper magnetic layer and by properly selecting the type and amount of a resin binder contained in the upper magnetic layer, a satisfactory abrasion effect can be obtained. This effect can be obtained, even if the abrasive with a small particle diameter is used without necessity of increase of the amount thereof. In addition, by using this abrasive, even if the upper magnetic layer is thin, the surfaces of the upper magnetic layer and the lower magnetic layer can be smoothened. Therefore, an excellent magnetic recording medium having high recording and reproduction characteristics in a wide wavelength range and high running durability can be provided. In particular, the recording and reproduction characteristics in a short wavelength range can be improved. A hexagonal ferrite powder can be used as a magnetic powder for recording in a short wavelength range.

6 Claims, No Drawings

MAGNETIC RECORDING MEDIUM HAVING TWO MAGNETIC LAYERS COMPRISING MAGNETIC POWDER AND BINDER

This application is a continuation of application Ser. No. 07/885,745 filed May 19, 1992, now abandoned.

BACKGROUND OF THE INVENTION

1. Field of the Invention

The present invention relates to a magnetic recording medium with a high recording density and excellent recording characteristics in a wide wavelength range from a short wavelength to a long wavelength.

2. Description of the Related Art

Conventionally, a coated type magnetic recording medium is produced by coating a magnetic powder such as a ferrite or iron powder on a base material such as a polyester film along with a resin binder. This resin binder is added so as to improve the dispersion property of the magnetic powder and the running durability of the magnetic recording medium. It is known that the amount of resin binder to be added to a magnetic powder of 100 parts by weight is at least 10 parts by weight.

Recently, needs of magnetic recording media with high recording density have been increasing. As one of the methods for satisfying such needs, the particle diameter of the magnetic powder is decreased and the coercive force (Hc) thereof is strengthened. As fine-particle magnetic powders employable for high density recording, a metal powder whose particle diameter is 0.3 µm or less, an ultra-fine hexagonal powder such as barium ferrite and others are suitable. This is because the above mentioned fine-particles of magnetic powders are so arranged in the magnetic layer, which is made by smoothly coating the particles on the base material with a high packing ratio, that magnetized direction of them are perpendicular to the medium surface and not magnetically repulsive one another. Thus, this type of magnetic recording media is suitable for high density recording.

However, although a magnetic layer containing a fine magnetic powder with a high coercive force has high reproduction output in a short wavelength range, the reproduction output in a long wavelength range is inferior to that of the conventional medium containing needle shaped γ-ferrite. To solve such a problem, a two-layer coated magnetic recording medium has been proposed. The two-layer type coating magnetic recording medium comprises a non-magnetic base material, a lower magnetic layer containing a magnetic powder with a relatively low coercive force suitable for recording in a long wavelength range, and an upper magnetic layer containing a magnetic powder with a small particle diameter and a high coercive force suitable for recording in a short wavelength range. The lower magnetic layer is disposed on the non-magnetic base material, the upper magnetic layer being disposed on the lower magnetic layer. Thus, this two-layer coated magnetic recording medium can deal with a wider wavelength range.

To satisfactorily obtain the characteristics of this two-layer coated medium, it is preferable to set the thickness of the upper magnetic layer to an order of submicrons. To do this, it is necessary to decrease as small the surface roughness of the upper magnetic layer as possible, thereby improving the smoothness of the surface. Thus, it is also necessary to decrease as low the surface roughness of the lower magnetic layer as possible, thereby preventing the surface property of the lower magnetic layer from negatively affecting that of the upper magnetic layer.

In addition, to improve the reproduction output of the magnetic recording medium, the magnetic particles of the magnetic coating materials composing the upper magnetic layer should be dispersed into the resin binder in the state that each magnetic particle is separated almost individually, i.e., in the state of almost primary particles. Moreover, the packing ratio of the magnetic particles to the resin binder should be as high as possible.

However, in the conventional two-layer coated medium, it has been difficult to set the coating thickness of the upper magnetic layer to an order of submicrons. This is because the surface property of the lower magnetic layer negatively affects that of the upper magnetic layer. Moreover, disturbance which takes place at the interface between the lower magnetic layer and the upper magnetic layer has resulted in increase of noise in recording and reproducing. These problems have been especially remarkable when the lower magnetic layer and the upper magnetic layer are coated on the base material at the same time. For example, when the upper magnetic layer having a coating thickness of 0.5 µm or less has been formed, part of the lower magnetic layer has been occasionally extruded to the upper magnetic layer.

The "substantially at the same time" means that the upper magnetic layer is coated before the organic solvent of the coating material for the lower magnetic layer is not evaporated and dried. Thus, even if these layers are not coated at the same time, but with a slight delay, it is construed that these layers should be coated at the same time.

The surface property of the upper magnetic layer and that of the interface between the upper magnetic layer and the lower magnetic layer is remarkably affected by the type and amount of various organic or inorganic additives such as carbon black and an abrasive which are used along with the resin binder.

For example, the abrasive has important functions for improving the running durability of a medium and for preventing a head from clogging. The abrasive is conventionally made of inorganic particles with high hardness and average particle diameter of 0.5 µm to 1.0 µm or more (defined with a median diameter on a weight cumulative particle distribution curve). However, when a coating material containing an abrasive with a particle diameter of 0.5 µm or more for use with the upper magnetic layer has been coated along with a coating material for use with the lower magnetic layer, it has been difficult to decrease the thickness of the upper magnetic layer to 0.5 µm or less. This is because the surface of the lower magnetic layer which has been coated is remarkably disturbed by the particles of the abrasive contained in the coating material for use with the upper magnetic layer.

To prevent such a problem, the coating material for use with the lower magnetic layer has been coated in advance and then dried. Thereafter, the coating material for use with the upper magnetic layer was coated on the dried film. However, in this case, another problem has taken place. In other words, the particles of the abrasive has extruded to the surface of the upper magnetic layer, thereby damaging the recording and reproduction head while the medium running.

To prevent the extrusion of the particles of the abrasive, it has been possible to use an abrasive composed of small particles. However, to achieve the same effect by means of the abrasive with a small particle diameter, the amount of abrasive to be added to the medium had had to be increased. When the amount of abrasive is increased, the packing ratio of the magnetic powder is decreased. Thus, the reproduction output of the medium were remarkably deteriorated.

Furthermore, as the size of magnetic powder particles for use with the upper magnetic layer is so small, it has been becoming difficult to mix these particles with resin binder so thoroughly that each particle are separated individually. Likewise, it has been becoming further difficult to decrease the amount of resin binder, so as to increase the packing ratio of the magnetic powder, and it has also becoming more difficult to decrease the surface roughness. As the size of the magnetic powder particles is smaller, it is technically more difficult to improve the reproduction output of the magnetic recording medium.

In other words, according to the needs of high recording density of the magnetic recording media, the dispersion techniques of ultra-fine magnetic powders for use with the upper magnetic layer have not been satisfactorily established. In addition, the smoothness of the coated surface and the packing density of the magnetic powder of the upper magnetic layer have not been adequately improved. As a result, the reproduction output level in a short wavelength range has not achieved the level as is expected from the particle diameter of the magnetic powder for use with the upper magnetic layer. Moreover, when the magnetic powder for use with the upper magnetic layer has been dispersed in sufficiently, noise in recording and reproducing has been increased. These problems resulted in difficulties when recording in a short wavelength range.

SUMMARY OF THE INVENTION

The present invention is made to solve the problems with respect to conventional two-layer high density magnetic recording media for recording in a wide wavelength range. An object of the present invention is to minimize the roughness of the interface between the layers and the roughness of the surface of the medium and improve dispersion property and packing ratio of a magnetic powder for use with the upper magnetic layer. Thus, the smoothness of the surface of the medium is improved. Therefore, a magnetic recording medium with high moving durability and high recording characteristics can be provided.

The magnetic recording medium in accordance with the present invention comprises a non-magnetic base material, a lower magnetic layer containing a magnetic powder for recording in a long wavelength range and a resin binder, and an upper magnetic layer containing a magnetic powder for recording in a short wavelength range and a resin binder. The lower magnetic layer is disposed on the base material and the upper magnetic layer is disposed on the lower magnetic layer. The upper magnetic layer contains an abrasive whose median diameter is in the range from 0.05 to 0.3 μm, the amount of resin binder contained in the upper magnetic layer being in the range from 2 to 12 parts by weight for the magnetic powder of 100 parts by weight.

Examples of the abrasive which can be used for the upper magnetic layer and the lower magnetic layer in accordance with the present invention are inorganic powders of $TiO_2$, $\alpha\text{-}Fe_2O_3$, $Cr_2O_3$, $\alpha\text{-}Al_2O_3$, $SiO_2$, and SiC where the Morse hardness is 5 or more. When the median diameter of the particles of the abrasive for use with the upper magnetic layer is less than 0.05 μm, the abrasion effect necessary for the medium cannot be obtained. In contrast, when this median diameter exceeds 0.3 μm, the particles disturb the surface of the lower magnetic layer, thereby damaging the recording and reproduction head.

To prevent particles of an abrasive contained in the upper magnetic layer from disturbing the surface of the lower magnetic layer and from damaging the recording and reproduction head, in addition to limiting the median diameter of the abrasive, it is preferable that the maximum particle diameter of the abrasive should be limited to 1.0 μm or less. Moreover, the amount of the particles of the abrasive is preferably in the range from 3 to 10 parts by weight for the magnetic powder of 100 parts by weight. When the amount of the particles of the abrasive is less than 3 parts by weight, the desired abrasion effect cannot be accomplished. In contrast, when this amount exceeds 10 parts by weight, the packing ratio of the magnetic powder decreases and thereby the desired recording and reproduction output cannot be obtained.

The above mentioned resin binder is defined as a total amount of a resin binder which is added for dispersing a magnetic powder and a hardener which is added prior to coating thereof. The amount of resin binder for use with the upper magnetic layer in accordance with the present invention is particularly important. Preferably, the above mentioned amount of resin binder for a magnetic powder of 100 parts by weight is in the range from 2 to 12 parts by weight. More preferably, the amount of resin binder for a magnetic powder of 100 parts by weight is in the range from 3 to 8 parts by weight. When the amount of resin binder for a magnetic powder of 100 parts by weight is less than 2 parts by weight, the magnetic powder cannot be satisfactorily dispersed. Thus, desired reproduction output cannot be obtained. In addition, a required strength of coated Surface also cannot be obtained. Thus, the amount of resin binder which is less than 2 parts by weight is not preferable. In contrast, when the amount of resin binder exceeds 12 parts by weight, the packing ratio of the magnetic powder decreases. Likewise, the desired reproduction output cannot be obtained. Thus, the amount of resin binder which exceeds 12 parts by weight is also not preferable.

In accordance with the present invention, it is preferable that the thicknesses of the lower magnetic layer of the magnetic recording medium should be in the range from 1 to 3 μm and that the thickness of the upper magnetic layer thereof should be in the range from 0.05 to 0.5 μm. When the thickness of the lower magnetic layer is less than 1 μm, the properties for recording in a long wavelength range cannot be obtained. In contrast, when the thickness of the lower magnetic layer exceeds 3 μm, the desired surface property and the coating strength cannot be obtained. Moreover, when the thickness of the upper magnetic layer is less than 0.05 μm, the desired properties with respect to the adhesive strength and the recording and reproduction output in a short wavelength range are deteriorated. Thus, the upper limit of the film thickness of the upper magnetic layer is determined from a point of view of deterioration of surface property and a space loss effect for recording in a long wavelength range.

According to the present invention, examples of the resin binder for dispersing magnetic coating materials for use with the lower magnetic layer and the upper magnetic layer are copolymers of vinyl chloride and vinyl acetate, polyester resin, polyether resin, polyurethane resin, and polyacrylic resin or the like, having a polar group such as hydroxyl group, carboxyl group, phosphoric acid group, $-SO_3M$ group, $-OSO_3M$ group (M is hydrogen or an alkali metal atom), amino group, alkyl group, ammonium group, or alkyl ammonium group. Among them, a resin binder containing a repeating unit having at least one polar group selected from the group consisting of $-SO_2M$ and $-OSO_3M$ is particularly suitable for a resin binder in accordance with the present invention. This is considered to be because each of these resin binders fittingly adsorbs to a magnetic powder, thereby helping dispersion thereof. And, it is not necessary for a single polar group to exist in a resin molecule. Even if two or more types of polar groups coexist in the same molecule, the effect of the present invention is not lost at all. The amount of polar group in the resin binder is important. To accomplish the effect of the present invention, the amount of polar group is preferably at least in the range from 0.01 mmol/g to 4.0 mmol/g, more preferably, in the range from 0.05 mmol/g to 2.0 mmol/g.

According to the present invention, the molecular weight of the above mentioned resin binder is preferably in the range from 1,000 to 60,000. However, the molecular weight of the resin binder for use with each layer should be varied to some extent in accordance with the function thereof. For example, with respect to the upper magnetic layer, the packing ratio of the magnetic powder should be high. Thus, with respect to the upper magnetic layer, a resin binder whose molecular weight is relatively low and is in the above mentioned range is used. In other words, when the molecular weight of the resin binder is less than 1,000, the effect thereof is low. In contrast, when the molecular weight of the resin binder exceeds 20,000, since the required amount thereof increases, the required high packing ratio cannot be attained. In other words, it is preferable that the molecular weight of the resin binder for use with the upper magnetic layer should be in the range from 1,000 to 20,000. Generally, with respect to the lower magnetic layer, to improve durability, a resin binder whose molecular weight is 10,000 or more is used.

Among the polar groups with respect to the resin binder in accordance with the present invention, —$SO_2M$ and —$OSO_2M$ groups can be obtained in the following manner. When a resin binder containing at least one polar group selected from the group consisting of —$SO_3M$ and —$OSO_2M$ is a resin made by vinyl polymerization, vinyl monomer containing this polar group is copolymerized with conventional vinyl monomer containing no polar group. On the other hand, when the resin binder containing the above mentioned polar group is a polyester resin or a polyurethane resin, polybasic acid or polyhydric alcohol which is a constitutive component thereof is mixed with polybasic acid or polyhydric alcohol which contains the above mentioned polar group, and then a condensation reaction thereof is performed. Thus, the resin binder containing the above mentioned polar group can be obtained. Examples of the vinyl monomer, polybasic acid, and polyhydric alcohol containing the above mentioned polar group are vinyl sulfonic acid, vinyl benzene sulfonic acid, metal salts of 2-acrylic amide-2-methyl propane sulfonic acid and compounds substantially given by the following chemical formula

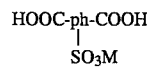

(where ph is an aromatic ring, and M is an alkaline metal).

Examples of a conventional vinyl resin monomer which is copolymerized with vinyl monomer having a polar group such as metal salt of sulfonic acid are various types of monomers including vinyl chloride, vinyl alcohol, maleic anhydride, vinyl acetate, acrylate monomers, vinylidene chloride, vinyl acetal, vinyl butyral, acrylic esters, acrylonitrile, and styrene.

Examples of the conventional polyhydric alcohol which is copolymerized with a polybasic acid having a polar group such as sulfonic acid metal salt are 1,4-butanediol, 1,6-hexamethylenediol, cyclohexanediol, ethylene glycol, diethyleneglycol, triethyleneglycol, propyleneglycol, glycerin, and neopentyl alcohol. On the other hand, examples of the polybasic acid which is copolymerized with polyhydric alcohol having a polar group such as sulfonic acid metal salt are terephthalic acid, isophthalic acid, adipic acid, sebacic acid, oxalic acid, succinic acid, glutaric acid, pyromellitic acid, suberic acid, and azelaic acid.

Among the resins which contain sulfonic acid metal salt group obtained in the above mentioned manner in accordance with the present invention, polyester group resins are especially suitable. In particular, a polyester polyurethane resin which contains polybasic acid having an aliphatic chain whose carbon number is in the range from 4 to 18 or that containing a polyhydric alcohol in the resin skelton is very suitable. When these polyester group resins are so urethanated by aromatic diisocyanate such as tolylenediisocyanate or aliphatic diisocyanate such as 1,4-tetramethylenediisocyanate, 1,6-hexamethylenediisocyanate, and isophoronediisocyanate, that the dispersion property and durability thereof can be further improved.

In addition, to improve the mechanical strength and the moving property of the coated films, various resin binders can be added. Examples of the resins which can be added are polyurethane resin, polyester resin, polycarbonate resin, polyacrylic resin, polyamide resin, epoxy resin, phenol resin, polyether resin, phenoxy resin, melamine resin, vinyl butyral resin, furan resin, vinyl chloride resin, vinyl acetate resin, vinyl alcohol resin, mixtures thereof, and copolymers thereof. The amount of the resin binders being added is 80 weight % or less of all the resin binders.

The coating materials using the above mentioned resin binders are added with a polyamine or polyisocyanate group hardener when the coating materials are coated on the base material along with the magnetic powder. Thus, the mechanical strength and the durability of the coated film are improved.

In the constitution of the present invention, it is preferable that a magnetic powder for use with the lower magnetic layer should have a coercive force (Hc) in the range from of 300 to 1,000 Oe and a saturation magnetization (Ms) of 70 emu/cc or more. Examples of the magnetic powder having such properties are a metal powder whose main component is iron, a tri-iron tetraoxide powder, a γ-ferrite powder, a Co-denatured γ-ferrite powder, a Co-denatured magnetite powder, a chromium dioxide powder, and an iron nitride powder. The diameter of particles of these magnetic powders is preferably in the range from 0.3 to 1.0 μm.

Examples of a magnetic powder for use with the upper magnetic layer are a metal powder whose main component is iron and a hexagonal ferrite powder. Examples of the metal powder whose main component is iron are a Fe—Al metal powder, a Fe—Ni metal powder, a Fe—Al—P metal powder, a Fe—Ni—Si—Al metal powder, a Fe—Si—Al—Mn metal powder, a Fe—Mn—Zn metal powder, a Fe—Co—Ni metal powder, a Fe—Co—Ni—Cr metal powder, and a Fe—Co—Ni—P metal powder.

Among them, the hexagonal ferrite powder is particularly suitable for use with the upper magnetic layer. Examples of the hexagonal ferrite powder are Ba ferrite, Sr ferrite, Pb ferrite, and Ca ferrite which are M (Magnetoplumbite) or W type hexagonal; solid solutions thereof; and ion-substituted bodies substantially given by the following chemical formula

where Ma is one element selected from the group consisting of Ba, Sr, Ca, and Pb; Mb is at least two elements selected from the group consisting of Co, Zn, Ni, Cu, Mg, Mn, In, Ti, Sn, Ge, Zr, Hf, V, Nb, Sb, Ta, Cr, Mo, and W, one element being Nb; and n is a number in the range from 5.4 to 6.0.

More specifically, the hexagonal ferrite powder in accordance with the present invention is preferably a powder where part of Fe atoms which are a constitutive element of the uniaxial hexagonal ferrite crystal are substituted with a metal whose valence is 2 and Nb whose valence is 5. In addition, the hexagonal ferrite powder in accordance with the present invention is preferably a powder where part of Fe atoms are substituted with 0.05 to 0.5 Sn atom per chemical formula, the amount of substitution being set so that the magnetic coercive force is in the range from 500 to 3,000 Oe.

The 2 valence metals of the substituted elements mainly serve to decrease the coercive force of the hexagonal ferrite powder in a proper level. On the other hand, Nb, whose valence is 5, serves to increase the amount of saturation magnetization. In addition, Sn, whose valence is 4, serves to decrease a fluctuation of temperature property of the coercive force.

The adequate amount of substitution of the 2 valence metal ($M^{II}$) and that of the 5 valence metal ($M^{V}$) varies in accordance with a combination of $M^{II}$ and $M^{V}$. The amount of substitution of $M^{II}$ per chemical formula is approximately in the range from 0.5 to 1.2.

For example, the relation of the amounts of substitution of substituted elements with respect to magnetoplumbite type Ba ferrite can be substantially given by the following chemical formula,

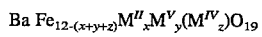

$$Ba\ Fe_{12-(x+y+z)}M^{II}_{x}M^{V}_{y}(M^{IV}_{z})O_{19}$$

where x, y, and z are the amounts of substitution of $M^{II}$, $M^{V}$, and $M^{IV}$ elements per chemical formula, respectively. The $M^{II}$, $M^{V}$, and $M^{IV}$ elements are a 2 valence metal, a 5 valence metal, and a 4 valence metal, respectively. In addition, the Fe atoms to be substituted is a 3 valence metal. In consideration of compensation of valence, the relation of $y=(x-z)/2$ is satisfied. In other words, the amount of substitution of $M^{V}$ can be uniformly determined from the substitution amounts of $M^{II}$ and $M^{IV}$.

When Sn is used as a $M^{IV}$ element, the proper amount of substitution of hexagonal ferrite per chemical formula is in the range from 0.05 to 0.5.

In addition, Ti with the same valence as Sn can be used.

Most of the metal powders containing iron as a main component which can be used for the upper magnetic layer in accordance with the present invention have needle shaped crystal forms. The particle diameters of their metal powders are represented with the length of their longer axis. The average particle diameters of the metal powders in accordance with the present invention are preferably in the range from 0.05 to 0.3 μm.

The above mentioned hexagonal ferrite powders have hexagonal plate shaped single crystal forms. The particle diameters of their hexagonal ferrite are represented with the length of the diagonal line of plate. The average particle diameters of the hexagonal ferrite powders in accordance with the present invention are preferably in the range from 0.01 to 0.1 μm. When the particle diameters of these magnetic powders are less than 0.01 μm, the amount of magnetization or the amount of coercive force decreases, thereby lowering reproduction output of the resultant magnetic recording media. In contrast, when the particle diameters of these magnetic powders exceed 0.1 μm, not only the improved effect of the reproduction output in a short wavelength range of the media being produced degrades, but also noise in recording and reproducing signals remarkably increases.

The coercive force of the metal powders and the hexagonal ferrite powders in accordance with the present invention is preferably in the range from 500 to 3,000 Oe. When the coercive force is less than 500 Oe, recording signals are not satisfactorily remaining on the recording media. In contrast, when the coercive force exceeds 3,000 Oe, the conventional recording and reproducing heads cannot properly write signals on the media.

Some abrasive may impede the dispersion of the magnetic powder. In this case, it is preferable to separately disperse the magnetic powder and the abrasive with the same binder resin, produce the two types of coating materials, and then mix them together.

In addition, it is possible to provide an intermediate layer between the upper magnetic layer and the lower magnetic layer so as to improve various properties such as adhesive property between the upper magnetic layer and the lower magnetic layer.

Then, a general method for obtaining the magnetic recording medium in accordance with the present invention will be described.

A magnetic coating material for use with the magnetic recording medium in accordance with the present invention is produced in the following manner. First, a magnetic powder, a resin binder, and an organic solvent are mixed with each other. Thereafter, the magnetic powder is dispersed in the mixture by using a ball mill or a sand grinder. Thereby, a magnetic coating material is produced. Examples of the organic solvent are toluene, xylene, cyclohexanone, methyl ethyl ketone, methyl isobutyl ketone, and nitropropane. One of these organic solvents or these several organic solvents mixed together can be used. Moreover, to improve the mechanical strength of the coated film and the durability thereof, it is possible to add a polyamine type hardener or a polyisocyanate type hardener to the coating material. As described above, the resin binder in accordance with the present invention is defined as a total amount of a resin binder which is added for dispersing a magnetic powder and a hardener which is added prior to coating thereof. In addition to the hardener, if necessary, it is possible to add a dispersant, a lubricant, an abrasive and electroconductive agent which will be described in detail.

Examples of the dispersant for dispersing a magnetic powder of the upper magnetic layer into a resin binder are an anionic surface active agent, a cationic surface active agent, and a non-ionic surface active agent. As an anionic surface active agent, a nonylphenol ester of phosphoric acid and lecithin are especially effective. In the kneading step of a magnetic powder and a resin binder, by adding a silane coupling agent or a titan coupling agent besides such dispersants, the magnetic powder can be further equally dispersed.

It is preferable that a lubricant should be added to at least one of the lower magnetic layer and the upper magnetic layer. Example of the preferable lubricant are fatty acid whose carbon number is 12 or more, fatty acid ester, silicone oil, fluorinated silicone oil, and fluorinated hydrocarbon oil.

In addition, if necessary, a powder of electroconductive agent can be added to the lower magnetic layer or the intermediate layer. Examples of this powder are carbon black, titanium oxide, and tin oxide.

Examples of the non-magnetic base material in accordance with the present invention are a polyester film, a polycarbonate film, a polyimide film, a polysulfonate film, a polyamide film, and a polyoxazole film. It is preferable that a back layer containing a powder of electroconductive agent such as carbon black should be formed on a surface where a magnetic coating material is not coated. This back layer serves to prevent static electricity from taking place on the base material, improve the running property of the medium, and prevent blocking with the magnetic layer. Thus, the back layer is produced so that it has a surface resistance of $10^6 \Omega$ or less. In addition, the surface property of the back layer is also very important. The average surface roughness (Rz) of the back layer measured by a needle contacting type surface roughness meter for 10 points should be 0.5 µm or less.

Moreover, to improve the adhesive strength of the magnetic layers, which are the upper magnetic layer and the lower magnetic layer, of the magnetic recording medium in accordance with the present invention and thereby enhance the durability of the medium, a plasma treatment for the base material or a base layer containing carbon black coated on the base material is especially effective. This base layer, the lower magnetic layer, and the upper magnetic layer can be produced by using a three-layer coating slot die coater with one coating operation.

When a coating material for use with the upper magnetic layer is produced, a metal powder for use with the upper magnetic layer or a magnetic powder such as a hexagonal ferrite powder is mixed and dispersed in a resin binder, an organic solvent, and a mixture of the above mentioned various additives. In these mixing and dispersing steps, it is important to equally disperse the magnetic powder in the resin binder. Thus, the magnetic powder can be packed to the magnetic layers at a high rate. As the magnetic powder is equally dispersed, noise in recording and reproducing decreases, and the surface property of the magnetic layers are improved, thereby increasing the output in the short wavelength range.

To equally disperse the magnetic powder, a method for kneading the above mentioned mixture in advance and furthermore dispersing the resultant substance by a ball mill or a sand glass is effective. When a hexagonal ferrite powder is produced by a glass crystallizing method, and obtained in water in a slurry state, it is possible to add the above mentioned resin binder and the additive to the slurry and then knead the mixture. This kneading method is referred to as flashing method. According to this method, without a negative effect of the coagulation in the drying step of magnetic powder, it is possible to adsorb molecules of the resin binder or those of the dispersant to the surface of the magnetic powder. Thus, the magnetic powder can be equally dispersed easily.

The kneaded substance is dewatered under a reduced pressure environment while an organic solvent is added. Alternatively, the kneaded substance is obtained as a dried powder. Thereafter, an organic solvent is added to the dried substance and then transferred to a dispersion device such as a sand grinder so as to more equally disperse the magnetic powder.

After the dispersion step, the magnetic coating material is filtered by a filter and then a hardener such as polyisocyanate is added thereto. Thereafter, the resultant coating material is applied on the base material by a conventional coating method using a reverse coater, a gravure coater, an applicator coater, a slot die coater, or the like.

Among such devices, the slot die coater is suitable for obtaining the effect in accordance with the present invention. By using the slot die coater, the lower magnetic layer and the upper magnetic layer can be coated substantially at the same time. The "substantially at the same time" means that the upper magnetic layer is coated before the organic solvent of the coating material for the lower magnetic layer is not evaporated and dried. Thus, even if these layers are coated not at the same time, but with a slight delay, it is construed that these layers should be coated at the same time. Thus, it is not always necessary to integrate the slot dies into one device.

Thereafter, before the organic solvent in the film evaporates, the multi-layer coated film formed on the base material is guided to a magnetic field oriented in the longitudinal direction or vertical direction of the surface of the base material. The magnetic powder contained in the magnetic layer is oriented so that the easily magnetizable axis is oriented to the direction of the magnetic field.

The vertical orientation is accomplished by passing the coated film perpendicularly to the magnetic field produced between an N pole iron core and an S pole iron core which are arranged opposite to each other. On the other hand, the longitudinal orientation is accomplished by passing the coated film between two iron cores with the same pole or by passing the base material at the center of a solenoid (air core coil). It is preferable that the coated film should be dried when it exits from the magnetic field. To remove the organic solvent in the magnetic field, it is preferable that a heating plate and a vapor sucking device or a hot air blower and an air exhausting device should be provided.

After the predetermined orientation treatment is performed for the coated film by the above mentioned steps, the surface thereof is smoothened by a calender. Thereafter, the surface of the coated film is cured and slit in a desired width. Thus, the magnetic recording medium in accordance with the present invention is obtained. For the magnetic recording medium in accordance with the present invention, the shape of the sliced surface by the slitting step is important. When the coated film is improperly slit, the surface of the magnetic layers in the vicinity of the sliced portion will be cracked. When the surface of the magnetic layer is cracked, the images recorded and reproduced will be disordered or the running durability of the medium will be deteriorated. Such a problem can be solved by slitting the coated film with a laser light.

In accordance with the present invention, since there are provided the lower magnetic layer containing magnetic powder with low coercive force and high saturation magnetization and the upper magnetic layer containing magnetic powder with high coercive force, small particle diameter, and high packing ratio, the medium having high recording characteristics both in a short wavelength range and in a long wavelength range can be obtained.

With respect to the upper magnetic layer in accordance with the present invention, since a resin binder which contains a polar group such as sulfonic acid salt group having a high adsorption property and whose molecular amount is limited to a predetermined range is selected, this resin binder properly adsorbs to the magnetic powder, thereby helping the dispersion of the magnetic powder. Thus, the amount of the resin binder to be added to a metal powder or a hexagonal ferrite powder of 100 parts by weight can be limited to a very small range of 2 to 12 parts by weight in comparison with the magnetic layers of the conventional magnetic recording medium. Thus, the magnetic layers packed with the magnetic powder having high Hc and small particle diameter can be obtained at high packing ratio. As the magnetic powder is equally dispersed, the surface property of the magnetic layers being formed is improved.

When a magnetic powder with the above mentioned small particle diameter, a resin with the above mentioned content, and an abrasive with a smaller particle diameter than before, the above mentioned effect can be satisfactorily accomplished. In other words, in accordance with the present invention, by adding a small amount of abrasive, the abrasion effect can be satisfactorily accomplished. Thus, the upper magnetic layer which is packed with a magnetic powder having high coercive force and small particle diameter at a high ratio can be provided. Thus, the top surface of the upper magnetic layer and the interface between the upper magnetic layer and the lower magnetic layer become smooth. In addition, the upper magnetic surface has a satisfactory abrasion effect.

DESCRIPTION OF PREFERRED EMBODIMENTS

Then, preferred embodiments in accordance with the present invention will be described in detail.

Embodiment 1

First, the following materials of the <coating material for lower magnetic layer> were measured and loaded into a kneader. Compositions of <coating material for lower magnetic layer>

Co-γ ferrite powder . . . 100 parts by weight
(Hc=650 Oe; number average particle diameter=0.5 μm; specific surface area=40 $m^2/g$)

Carbon black . . . 5 parts by weight
(Average particle diameter=0.02 μm; specific surface area=200 $m^2/g$)

Urethane resin containing sulfonic acid group . . . 10 parts by weight
(Molecular weight Mw=30,000; content of sodium sulfonate group=0.3 mmol/g)

Copolymer of vinyl chloride and vinyl acetate . . . 5 parts by weight
(Molecular weight=20,000; content of carboxyl group=0.4 mmol/g)

Lecithin of soybean oil . . . 2 parts by weight

Stearic acid . . . 2 parts by weight

Butyl stearate . . . 2 parts by weight

Cyclohexanone/methyl ethyl ketone . . . 30 parts by weight (1/1 mixed solvent)

After these materials were kneaded, the kneaded mixture was added with the above mentioned mixed solvent of 150 parts of weight and then diluted by a dissolver. Thereafter, the resultant mixture was dispersed by a sand grinder. Then, a coating material was obtained. Thereafter, the coating material was filtered by a filter with a pore size of 0.6 μm. The filtered coating material was added with Colonate L (tradename: 50 % diluted substance of a tolylenediisocyanate group hardener: Nippon Polyurethane K.K.) of 1.5 parts by weight. Thus, the coating material for the lower magnetic layer was obtained.

Thereafter, the following materials of <coating material for upper magnetic layer> were measured and loaded into the kneader.

Compositions of <paint for upper magnetic layer>

Co-, Ti-, Nb-substituted barium ferrite powder . . . 100 parts by weight
(Hc=1,000 Oe; number average particle diameter=0.05 μm; specific surface area=38 $m^2/g$)

Sulfonated urethane resin . . . 4 parts by weight
(Molecular weight=10,000; content of sodium sulfonate group=0.5 mmol/g)

Gafac RE-610 . . . 2 parts by weight
(Trade name: phosphoric acid ester group surface active agent: Toho Chemical K.K.)

Stearic acid . . . 1 part by weight

Alumina . . . 5 parts by weight
(Median diameter=0.3 μm; maximum particle diameter=0.8 μm)

Cyclohexanone/methyl ethyl ketone . . . 25 parts by weight (1/1 mixed solvent)

Thereafter, these materials are kneaded for approximately 30 minutes. Then, the kneaded mixture was added with the mixed solvent of 170 parts by weight and then diluted. Next, the mixture was dispersed by the sand grinder. Thus, a coating material was obtained. The coating material was filtered by a filter with a bore size of 0.3 μm. Thereafter, the coating material was mixed with Colonate L of 1.5 parts by weight (tradename: 50 % diluted substance of a tolylenediisocyanate group hardener: Nippon Polyurethane K.K.) of 2.0 parts by weight. Thus, the coating material for the upper magnetic layer was obtained.

Thereafter, the coating materials for the <lower magnetic layer> and the <upper magnetic layer> were loaded to respective slot die coaters in this order. The supplied coating materials were applied on a polyester film (thickness=11 μm). An electroconductive coating material containing carbon black had been already coated on the rear side of the polyester film. The thickness of the coated layer was controlled by the amount of coating material supplied to the dies. In this example, the dies were controlled so that the thicknesses of the upper magnetic layer and the lower magnetic layer were 0.3 μm and 2.5 μm, respectively. Before the two-layer coated film was dried, the film was passed through a solenoid which generated a magnetic field of approximately 6 kOe. Thus, the organic solvent was evaporated and dried.

The above mentioned coated film was kept in a cure oven at a temperature of 40 ° C for four days and then slit in a 8-mm wide tape shape. This medium specimen was evaluated with respect to surface roughness, recording and reproducing characteristics, S/N ratio, still durability, and damage of the heads.

Embodiment 2

A two-layer coated type 8-mm wide tape was produced in the same manner as the embodiment 1 except that a Fe—Ni metal powder (Hc=1,500 Oe; number average particle diameter=0.15 μm; specific surface area=50 $m^2/g$) was used instead of the Co-, Ti-, Nb-substituted barium ferrite powder for use with the <coating material for upper magnetic layer> in accordance with the embodiment 1 and that the amount of the sulfonated urethane resin was 6 parts by weight. Thereafter, the tape was evaluated in the same manner as the embodiment 1.

Embodiment 3

A two-layer coated type 8-mm tape was produced in the same manner as the embodiment 1 except that alumina (median diameter=0.15 μm; maximum particle diameter=0.7 μm) was used instead of the alumina (median diameter=0.3 μm; maximum particle diameter=0.8 μm) for use with the <coating material for upper magnetic layer> in accordance with the embodiment 1. Thereafter, the obtained tape was evaluated in the same manner as the embodiment 1.

Embodiment 4

The sulfonated urethane resin of 10 parts by weight, the alumina (median diameter=0.20 μm; maximum particle diameter=0.8 μm) of 100 parts by weight, and the mixed solvent (1/1) of cyclohexanone/methyl ethyl ketone by 20 parts of weight for use with the <coating material for upper magnetic layer> in accordance with the embodiment 1 were kneaded in the kneader. Thereafter, the kneaded mixture was dispersed by the sand grinder. Thus, an alumina coating material was obtained.

A coating material excluding the alumina from the compositions of <coating material for the upper magnetic layer> in accordance with the embodiment 1 was produced in the same manner as the embodiment 1. Thereafter, the alumina coating material of 7 parts by weight was mixed to the above mentioned mixture of 100 parts by weight. Thereafter, a two-layer coated 8-mm width tape was produced in the same manner as the embodiment 1 except that the above mentioned coating material was used instead of the <coating material for upper magnetic layer> in accordance with the embodiment 1. Thereafter, the tape was evaluated in the same manner as the embodiment 1.

Embodiment 5

A two-layer coated type 8-mm width tape was produced in the same manner as the embodiment 1 except that chromium oxide $Cr_2O_3$ (median diameter=0.1 μm; maximum particle diameter=0.1 μm) was used instead of the alumina (median diameter=0.3 μm; maximum particle diameter=0.8 μm) for use with the <coating material for upper magnetic layer> in accordance with the embodiment 1. Thereafter, the obtained tape was evaluated in the same manner as the embodiment 1.

Embodiment 6.

A coating material was produced in the same coating material producing process as the <coating material for upper magnetic layer> in accordance with the embodiment 1 by using a Co-, Ti-, Nb-substituted barium ferrite powder (Hc=600 Oe; number average particle diameter=0.04 μm; specific surface area=40 m²/g) instead of the Co-, Ti-, Nb-substituted barium ferrite powder in the compositions of <coating material for upper magnetic layer> in accordance with the embodiment 1. Then, a two-layer coated type tape was produced in the same manner as the embodiment 1 except that the obtained coating material was used instead of the <coating material for upper magnetic layer> in accordance with the embodiment 1, that a polyester film (thickness=14 μm) was used, and that the slit width was ½ inch. Thereafter, the obtained tape was evaluated in the same manner as the embodiment 1.

Embodiment 7

A two-layer coated type 8-mm tape was produced in the same manner as the embodiment 1 except that the amount of the sulfonated urethane resin in the compositions of <coating material for upper magnetic layer> in accordance with the embodiment 1 was 2 parts by weight. Thereafter, the obtained tape was evaluated in the same manner as the embodiment 1.

Embodiment 8

A two-layer coated type 8-mm tape was produced in the same manner as the embodiment 1 except that the amount of the stearic acid for use with the <coating material for upper magnetic layer> was 3 parts by weight. Thereafter, the obtained tape was evaluated in the same manner as the embodiment 1.

Embodiment 9

A two-layer coated type 8-mm tape was produced in the same manner as the embodiment 1 except that a Fe—Ni metal powder (Hc=1400 Oe; average particle diameter=0.3 μm; specific surface area=45 m²/g) was used instead of the Co-γ ferrite powder in the compositions of <coating material for lower magnetic layer>. Thereafter, the obtained tape was evaluated in the same manner as the embodiment 1.

COMPARISON EXAMPLES 1 to 3

Two-layer coated type 8-mm tapes were produced in the same manners as the embodiments 1, 2, and 7 except that alumina (median diameter=0.5 μm; maximum particle diameter=1.1 μm) was used instead of the alumina in the compositions of <coating material for upper magnetic layer> in accordance with the embodiment 1, 2, and 7, respectively. Thereafter, the obtained tapes were evaluated in the same manner as the embodiment 1.

COMPARISON EXAMPLE 4

A two-layer coated type 8-mm tape was produced in the same manner as the embodiment 1 except that the amount of the sulfonated urethane resin in the compositions of <coating material for upper magnetic layer> in accordance with the embodiment 1 was 1 part by weight and that the amount of the Colonate L added to the obtained coating material was 0.5 part by weight. Thereafter, the tape was evaluated in the same manner as the embodiment 1.

COMPARISON EXAMPLE 5

A two-layer coated type 8-mm tape was produced in the same manner as the embodiment 1 except that the amount of the sulfonated urethane resin in the compositions of <coating material for upper magnetic layer> in accordance with the embodiment 1 was 12 parts by weight and that the amount of the Colonate L added to the obtained coating material was 3 parts by weight. Thereafter, the obtained tape was evaluated in the same manner as the embodiment 1.

For the evaluation of 14 types of the above mentioned two-layer coated type tape specimens, the surface roughness, recording and reproduction characteristics, S/N ratio, still durability, and damage of heads were measured. The evaluation results are listed in Table 1. For measurement of the recording and reproduction characteristics and the S/N ratio, an S-VHS deck and a high-band 8-mm deck were used.

TABLE 1

| Specimen | Surface roughness Rz (μm) | Recording and reproduction output (dB) | | S/N (dB) | Still durability | Damage of heads |
|---|---|---|---|---|---|---|
| | | λ = 1.5 μm | λ = 0.5 μm | λ = 0.5 μm | 25° C., 60% RH | |
| Embodiment 1 | 0.015 | +1.0 | +1.5 | +1.0 | 60 min or more | none |
| Embodiment 2 | 0.015 | +1.5 | +1.5 | +1.0 | 60 min or more | none |
| Embodiment 3 | 0.012 | +1.0 | +2.0 | +1.0 | 60 min or more | none |
| Embodiment 4 | 0.012 | +1.5 | +2.0 | +1.0 | 60 min or more | none |
| Embodiment 5 | 0.012 | +2.0 | +2.0 | +1.0 | 60 min or more | none |
| Embodiment 6 | 0.015 | +2.0 | +1.0 | +0.5 | 60 min or more | none |
| Embodiment 7 | 0.015 | +2.5 | +2.5 | +0.5 | 60 min or more | none |
| Embodiment 8 | 0.015 | +1.0 | +1.0 | +1.0 | 60 min or more | none |
| Embodiment 9 | 0.012 | +2.0 | +1.5 | +1.0 | 60 min or more | none |

TABLE 1-continued

| Specimen | Surface roughness Rz (μm) | Recording and reproduction output (dB) | | S/N (dB) | Still durability | Damage of |
| --- | --- | --- | --- | --- | --- | --- |
| | | λ = 1.5 μm | λ = 0.5 μm | λ = 0.5 μm | 25° C., 60% RH | heads |
| Comp. Ex. 1 | 0.028 | 0.0 | 0.0 | 0.0 | 45 min | scratched |
| Comp. Ex. 2 | 0.030 | +0.5 | +0.5 | 0.0 | 40 min | scratched |
| Comp. Ex. 3 | 0.035 | +0.5 | +0.5 | +0.5 | 25 min | scratched |
| Comp. Ex. 4 | 0.030 | +1.0 | +1.0 | +0.5 | 5 min | none |
| Comp. Ex. 5 | 0.035 | −1.0 | −2.0 | −0.5 | 30 min | none |

As described above, according to the present invention, by properly selecting a resin binder having a polar group for use with the upper magnetic layer, the amount of resin binder can be decreased. In addition, the dispersion property and the packing ratio of the magnetic powder can be improved. Thus, as listed in Table 1, even if an abrasive with a small particle diameter is used, the abrasion effect can be satisfactorily obtained without increase of the amount of abrasive. By using this abrasive, even if the upper magnetic layer is thin, the surfaces of the upper magnetic layer and the lower magnetic layer can be smoothened. Thus, the damage of head caused by the running tape can be reduced. In addition, a magnetic recording medium with low noise in recording and reproduction and high reproduction output in a wide wavelength range can be provided.

What is claimed is:

1. A magnetic recording medium comprising:

a non-magnetic base material;

a lower magnetic layer disposed on said non-magnetic base material and containing a magnetic powder and a resin binder; and an upper magnetic layer with a thickness of 0.05 to 0.5 μm disposed on said lower magnetic layer and containing a magnetic powder, an abrasive material and a resin binder comprising a curing agent of polyisocyanate and a polyurethane resin binder having at least one polar group selected from the group consisting of —$SO_3M$ and —$OSO_3M$, where M is hydrogen or an alkali metal atom, and an amount of said resin binder contained in said upper magnetic layer being in the range of 2 to 12 parts by weight for a magnetic powder of 100 parts by weight, wherein a weight average molecular weight of said polyurethane resin binder is in the range of 1,000 to 20,000, an amount of said polar group of said polyurethane resin binder is in the range of 0.01 to 4.0 m mol/g, an amount of said abrasive material contained in said upper layer is in the range of 3 to 10 parts by weight for a magnetic powder of 100 parts by weight, and a median diameter of said abrasive material is in the range of 0.05 to 0.3 μm.

2. The magnetic recording medium according to claim 1, wherein the magnetic powder in said lower magnetic layer has a coercive force in the range of 300 to 1,000 Oe and a saturation magnetization of 70 emu/cc or more.

3. The magnetic recording medium according to claim 1, wherein the magnetic powder in said upper magnetic layer is a metal powder mainly containing iron with a coercive force in the range of 500 to 3,000 Oe and a particle diameter in the range of 0.05 to 0.3 μm.

4. The magnetic recording medium according to claim 1, wherein the magnetic powder is a hexagonal ferrite powder with a coercive force in the range of 500 to 3,000 Oe and a particle diameter in the range of 0.01 to 0.1 μm.

5. The magnetic recording medium according to claim 4, wherein said hexagonal ferrite powder is a hexagonal ferrite powder where part of Fe atoms are substituted with Nb atoms.

6. The magnetic recording medium according to claim 1, wherein an amount of said resin binder in said upper magnetic layer is in the range of 3 to 8 parts by weight for said magnetic powder of 100 parts by weight.

\* \* \* \* \*